(12) United States Patent
Cohen Kassko et al.

(10) Patent No.: US 10,515,386 B2
(45) Date of Patent: Dec. 24, 2019

(54) SYSTEM AND METHOD FOR PERFORMING CROSS-PLATFORM BIG DATA ANALYTICS

(71) Applicant: Datorama Technologies, Ltd., Tel-Aviv (IL)

(72) Inventors: Efraeim Cohen Kassko, Herzeliya (IL); Ran Sarig, Tel Aviv (IL)

(73) Assignee: Datorama Technologies, Ltd., Tel-Aviv (IL)

( * ) Notice: Subject to any disclaimer, the term of this patent is extended or adjusted under 35 U.S.C. 154(b) by 993 days.

(21) Appl. No.: 14/077,951

(22) Filed: Nov. 12, 2013

(65) Prior Publication Data
US 2014/0200989 A1    Jul. 17, 2014

Related U.S. Application Data

(60) Provisional application No. 61/752,594, filed on Jan. 15, 2013.

(51) Int. Cl.
*G06Q 30/02* (2012.01)

(52) U.S. Cl.
CPC .............. *G06Q 30/0243* (2013.01)

(58) Field of Classification Search
CPC ...... H04L 12/1859; H04L 51/12; H04L 51/32
USPC ........................................ 705/14.1
See application file for complete search history.

(56) References Cited

U.S. PATENT DOCUMENTS

| | | |
|---|---|---|
| 5,877,759 A | 3/1999 | Bauer |
| 5,892,905 A | 4/1999 | Brandt et al. |
| 5,920,700 A | 7/1999 | Gordon et al. |
| 5,979,757 A | 11/1999 | Tracy et al. |
| 6,006,171 A | 12/1999 | Vines et al. |
| 6,023,766 A | 2/2000 | Yamamura |

(Continued)

FOREIGN PATENT DOCUMENTS

EP    0697669 A2    2/1996

OTHER PUBLICATIONS

Chandramouli et al: "Temporal Analytics on Big Data for Web Advertising." 2012 IEEE International Conference on Data Engineering, available at: https://ieeexplore.ieee.org/stamp/stamp.jsp?tp=&arnumber=6228075. (Year: 2012).*

*Primary Examiner* — Katherine Kolosowski-Gager
(74) *Attorney, Agent, or Firm* — Sterne, Kessler, Goldstein & Fox P.L.L.C.

(57) ABSTRACT

A system and method for performing cross-platform data analytics of advertising campaign information. The system comprises a data sanitizing module for receiving information related to at least one campaign from a plurality of advertising platforms and to produce a normalized dataset having data values that comply with a unified format; a storage and transformation (TS) engine for transforming data values in the normalized dataset into a format defined in a relaxed data schema, thereby resulting with a relaxed dataset, the TS engine is further configured to analyze the relaxed dataset to compute a plurality of campaign measurements of measurable data values included in the relaxed dataset; a data-mart module for storing the relaxed dataset together with the computed campaign measurements; and a management user interface (UI) module for allowing allow client devices access to data stored in the data-mart module, wherein the data-mart module is optimized for providing an accelerated data for data stored therein.

23 Claims, 6 Drawing Sheets

(56) References Cited

U.S. PATENT DOCUMENTS

| | | |
|---|---|---|
| 7,003,560 B1 | 2/2006 | Mullen et al. |
| 7,275,024 B2 | 9/2007 | Yeh et al. |
| 7,421,427 B2 | 9/2008 | DeForeest et al. |
| 7,647,298 B2 | 1/2010 | Adya et al. |
| 7,657,516 B2 | 2/2010 | Zaman et al. |
| 7,747,608 B1 | 6/2010 | Gheorghe et al. |
| 7,814,139 B2 | 10/2010 | Singh et al. |
| 8,676,628 B2 | 3/2014 | Martignoni et al. |
| 8,725,597 B2 | 5/2014 | Mauseth et al. |
| 9,183,272 B1 | 11/2015 | Jonsson et al. |
| 9,508,082 B1 | 11/2016 | Mannix et al. |
| 2007/0061318 A1* | 3/2007 | Azizi ................ G06F 17/30386 |
| 2007/0130015 A1 | 6/2007 | Starr et al. |
| 2008/0059288 A1 | 3/2008 | Kokernak |
| 2008/0109306 A1 | 5/2008 | Maigret et al. |
| 2010/0088177 A1* | 4/2010 | Lu .......................... G06Q 30/02 705/14.43 |
| 2010/0114841 A1* | 5/2010 | Holenstein ........ G06F 17/30306 707/690 |
| 2011/0040688 A1 | 2/2011 | Ren et al. |
| 2011/0041090 A1 | 2/2011 | Seolas et al. |
| 2011/0246267 A1* | 10/2011 | Williams ................ G06Q 30/02 705/14.4 |
| 2011/0258049 A1 | 10/2011 | Ramer et al. |
| 2011/0302025 A1* | 12/2011 | Hsiao ..................... G06Q 30/02 705/14.42 |
| 2012/0010933 A1 | 1/2012 | Satyavolu et al. |
| 2012/0046996 A1 | 2/2012 | Shah et al. |
| 2012/0054143 A1* | 3/2012 | Doig .................. G06Q 30/0243 706/47 |
| 2012/0130942 A1 | 5/2012 | Dipper et al. |
| 2012/0317474 A1 | 12/2012 | Parreira |
| 2013/0124653 A1* | 5/2013 | Vick et al. .................... 709/206 |
| 2013/0159081 A1* | 6/2013 | Shastry ............. G06Q 30/0274 705/14.23 |
| 2014/0095324 A1 | 4/2014 | Cabral et al. |
| 2014/0200988 A1 | 7/2014 | Kassko et al. |
| 2014/0200989 A1 | 7/2014 | Kassko et al. |

* cited by examiner

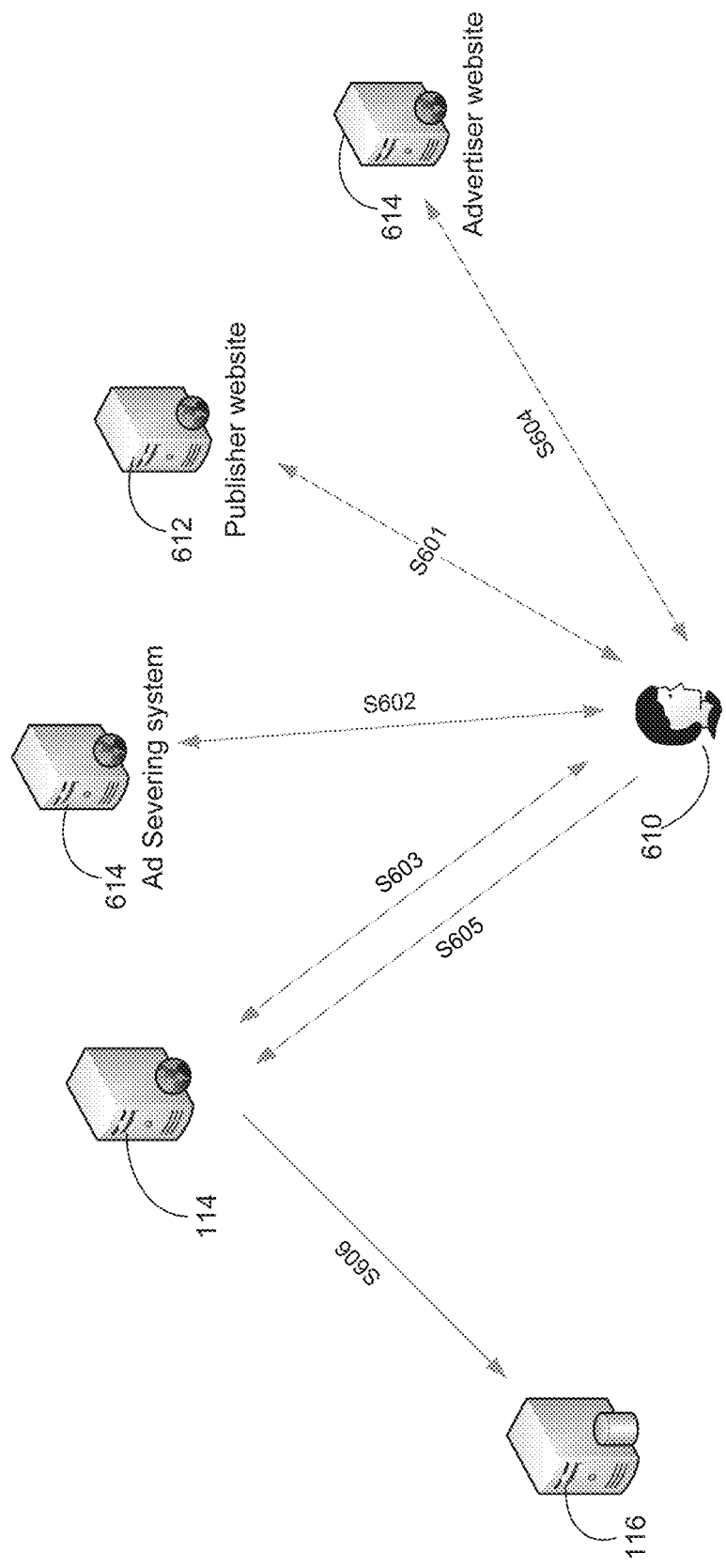

SYSTEM AND METHOD FOR PERFORMING CROSS-PLATFORM BIG DATA ANALYTICS

CROSS REFERENCE TO RELATED APPLICATIONS

This application claims the benefit of U.S. provisional patent application No. 61/752,594 filed Jan. 15, 2013, the contents of which are incorporated herein by reference.

TECHNICAL FIELD

The present invention relates generally to harnessing of big data gathered from multiple data sources, and more particularly to providing analytic measurements across multiple data sources.

BACKGROUND

Techniques for collecting, managing and providing real-time or near real-time relevant information have been enhanced through the use of the Internet and online research and information collection tools. One such set of tools is known as web analytics. Web analytics focuses on a company's own website for collection of online information, particularly traffic data. Web analytics are limited in that they only consider a subset of the relevant online universe, specifically the behavior of users of a given website.

Other analytics tools try to learn and predict the exposure and reach of advertisements displayed on web-sites including the social media websites. These tools gather statistics related to the reach and exposure of the advertisements. The statistics may include the number of impressions, URLs of web-pages displaying the advertisements, geographical locations of users that watched the advertisements, click-through rate of advertisements, the period of time that each viewer watched the advertisements, and so on.

Currently, every ad-serving company as well as each social media website independently gathers its own statistics and analytics with regard to the exposure and reach of advertisements. However, campaign managers who like to have better understanding about the reach and whether their budget was well spent have limited tools by which to do so. As a result, campaign managers cannot efficiently analyze and understand the performance of an advertisement campaign.

Specifically, the information gathered by a single ad-serving company or a social website per campaign may include trillions of records. Multiplying these by different companies serving the same campaigns makes it almost impossible for campaign managers to analyze the gathered information using existing tools. Furthermore, in addition to the volume of the gathered information, each ad-serving company presents the gathered statistics using a different format. This further increases the complexity of the campaign analysis.

It should be noted that failing to efficiently and accurately analyze the performance of an advertising campaign results in revenue losses for businesses, as their advertising budget is not being efficiently spent.

It would therefore be advantageous to provide a solution that would overcome the deficiencies noted above.

SUMMARY

Certain embodiments disclosed herein include a system for performing cross-platform data analytics of advertising campaign information. The system comprises a data sanitizing module configured to receive information related to at least one campaign from a plurality of advertising platforms and to produce a normalized dataset having data values that comply with a unified format; a storage and transformation (TS) engine configured to transform data values in the normalized dataset into a format defined in a relaxed data schema, thereby resulting with a relaxed dataset, the TS engine is further configured to analyze the relaxed dataset to compute a plurality of campaign measurements of measurable data values included in the relaxed dataset; a data-mart module configured to store the relaxed dataset together with the computed campaign measurements; and a management user interface (UI) module configured to allow client devices access to data stored in the data-mart module, wherein the data-mart module is optimized for providing an accelerated data for data stored therein.

Certain embodiments disclosed herein include a method for performing cross-platform data analytics of advertising campaign information. The method comprises receiving information related to at least one campaign from a plurality of advertising platforms; producing a normalized dataset having data values that comply with a unified format; transforming data values in the normalized dataset to a format defined in a relaxed data schema, thereby resulting with a relaxed dataset; analyzing the relaxed dataset to compute a plurality of campaign measurements of measurable data values included in the relaxed dataset; storing the relaxed dataset together with the computed campaign measurements in a data-mart module; and allowing client devices access to data stored in the data-mart module, wherein the data-mart module is optimized for providing an accelerated data for data stored therein.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

FIG. 6 is a process for tracking cookie level data according to an exemplary embodiment.

DETAILED DESCRIPTION

Figure 1:
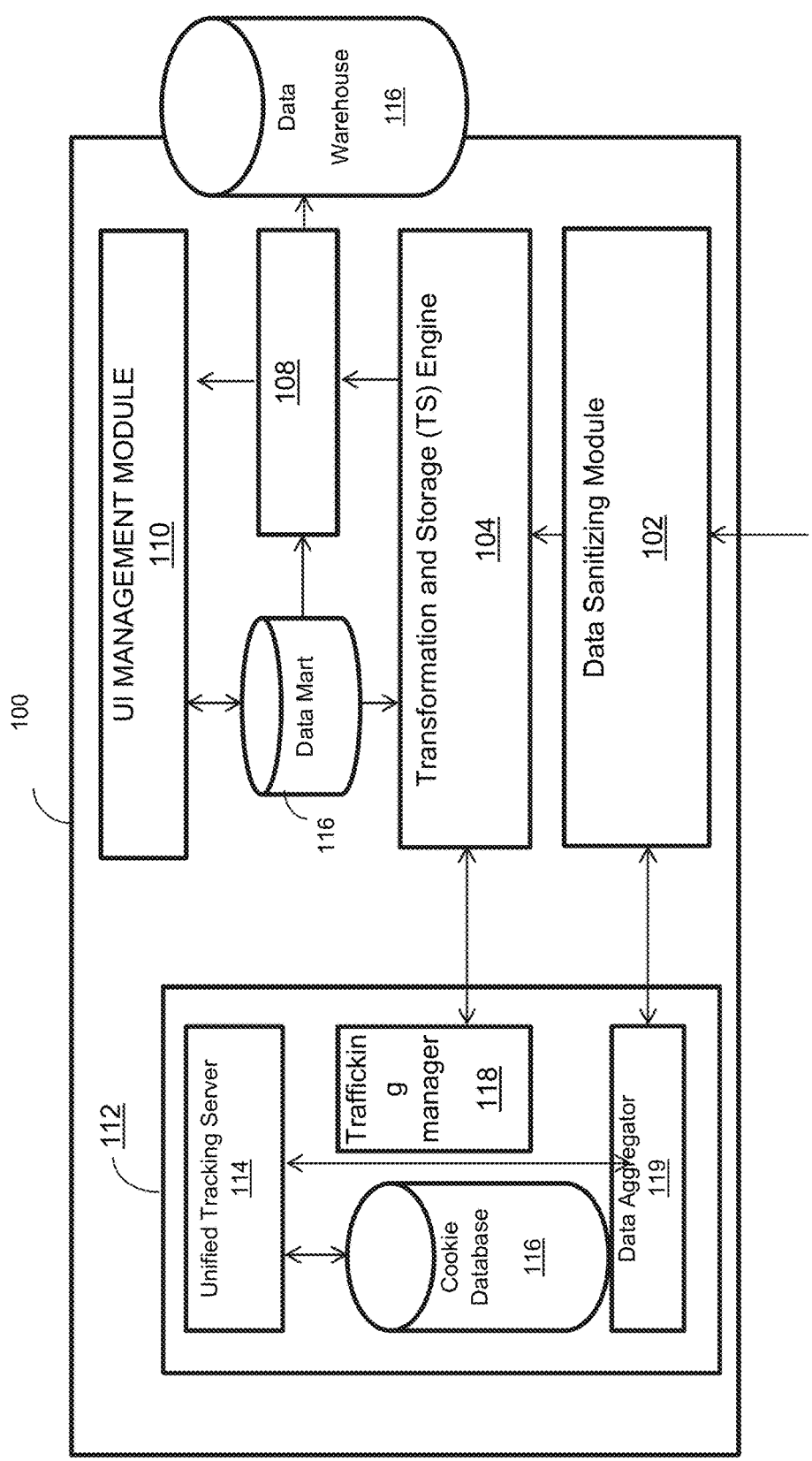
FIG. 1 is a schematic block diagram of a system for processing multimedia content displayed on a web-page according to an embodiment.

It is important to note that the embodiments disclosed herein are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain exemplary embodiments disclosed herein provide a system and methods that can be utilized to harness data, derive insights and make data driven decisions about advertisement campaigns. The disclosed system is natively built to integrate the multitude of data sources made available by a multitude of advertising platforms. The system allows users (e.g., campaign managers, etc.) to act upon insights derived from the gathered data. The advertising platforms may include, but are not limited to, ad-serving companies, social media websites, and other organizations that run and/or monitor analytics with regard to online advertising campaigns. Thus, the disclosed system efficiently solves the big data analytics challenge.

FIG. 1 shows an exemplary and non-limiting block diagram of a system 100 for cross-platform big data analytics according to one embodiment. The system 100 includes a data sanitizing module 102, a transformation and storage (TS) engine 104, a data mart module 106, a metadata database (DB) 108, a management user interface (UI) module 110, and a media-link module 112.

According to various exemplary embodiments, the data sanitizing module 102 is configured to load data into the system and produce a dataset normalized to a predefined unified format. That is, regardless of the format or the type of the input data, the output of the module 102 is a data set in a unified format. The input data uploaded to the module 102 may be, but is not limited to, unstructured data, structured data, standardized data (e.g., Excel, XML, etc.).

The data sanitizing module 102 is configured to support both push and pull operations facilitated through a plurality of data transfer protocols. Such protocols include, for example, FTP, SFTP, FTPS, HTTP, HTTPS, SMTP, POP3, and the like. According to one embodiment, the module 102 is also configured to decrypt the data if such is received in an encrypted form. The decryption keys are provided by the entity owning the data.

In another embodiment, the data sanitizing module 102 is configured to identify and associate the incoming data with the entity owning the data. Such an entity may be, for example, a public relations enterprise running the advertisement campaign, an advertising agency, a campaign manager, and so on. The processing of the data identification and its corresponding association is required in order to ensure the security of such data in the system 100. That is, to ensure that data related to one entity is not shared with or utilized by other entities using the system 100.

In one embodiment, the data sanitizing module 102 includes a scheduler (not shown) configured to pull data from pre-integrated API based data sources. The module 102 may further include a listener (not shown) for determining if the data is ready to be uploaded to the system 100. The listener is configured to any one of file transfer protocols supported by the module 102, e.g., FTP, SFTP, FTPS, HTTP, HTTPS, SMTP, POP3, and the like.

The TS engine 104 is a non-transitory data repository for the normalized data provided by module 102 or the media-link tracking and media-link module 112. The TS engine 104 is configured to transform the normalized dataset into a relaxed use-specific data schema. The relaxed data schema includes the data types, dimensions, metric definition, hierarchy, and aggregation function for each metric. Thereafter, the TS engine 104 is configured to execute a data transformation process to transform data values in the dataset to meet the relaxed data schema. The data transformation is performed by a plurality of transformation rules. This would result in a dataset (hereinafter "relaxed dataset") that includes relevant data gathered from multiple platforms, organized according to the relaxed data schema as specified by the user.

The TS engine 104 then analyzes the relaxed dataset to compute various campaign measurements of measurable data items included in the relaxed dataset. The analysis performed by the TS engine 104 includes data aggregation, and analytical as well as statistical calculations. For example and without limitation the statistical measurements for each such data item include an average, a normal distribution, a maximum value, a minimum value, an absolute value, and so on. A measurable data item is any item that that can be aggregated. For example, currency values, conversion rates, a number of hits, a number of clicks through, a number of fans, a number of page views, and a number of leads are merely a few examples for measurable data items.

In accordance with another embodiment, the various measurements are generated with respect to one or more campaign objectives defined by the user or preconfigured in the system 100. For example, if the campaign objective is to reach 100,000 fans in a social network, the TS engine 105 computes the current number of fans and the rate for new fans acquisition, and predicts whether the campaign objective can be met and when. Finally, the TS engine 104 is configured to populate the analyzed data and/or the resulting dataset into the data-mart module 106. It should be noted that the aggregation of the calculation performed by the engine 104 allows retrieving the processed information by the UI module 110 without latency. That is, the dataset is preprocessed without waiting for a specific query. The various processes performed by the TS engine 104 are discussed in greater detail with reference to FIG. 2.

In one embodiment, the data saved in the data-mart module 106 is optimized for providing fast access to the data. This allows producing reports, answering queries, and/or receiving the relevant portions of the aggregated data on the fly without any delay. The data mart module 106 is optimized for high concurrency, scalability and availability.

In another embodiment, the TS engine 104 is also configured to store the data mapped to the destination schema in the data warehouse 130 for later usage. This may include, for example, custom querying, service based analysis (Data Scientist team) and re-processing of the stored data.

The data warehouse 130 may be communicatively connected to the system 100 or integrated therein. The data warehouse 130 is accessed through the data mart module 106 which is configured to allow accelerated retrieval of the aggregated data stored in the data warehouse 130. In one embodiment, the data-mart module 106 is realized as a data structure server.

The metadata DB 108 stores and maintains metadata utilized by the system 100, and in particular by the TS engine 104 for processing and analyzing of campaigns' data. The metadata DB 108 may be integrated in the system 100 (as shown in FIG. 1) or communicatively connected thereto. In one embodiment, the metadata DB 108 is realized as an online transaction processing (OLTP) database which is configured to support the various processing performed by the system 100.

The management UI module 110 is configured to provide access to the system 100 from various client devices. The client devices may include, for example, a PC, a smart phone, a tablet computer, and the like. The communication with the management UI module is facilitated through an application executed over the client device, such an application may include a web browser. In one embodiment, the management UI module 110 implements a set of application programming interfaces (API) to allow communication with the client device.

In an embodiment, the TS engine 104 can analyze data provided by the data sanitizing module 102, where such data is typically loaded into the system 100 "off-line". That is, the data sources connected to the module 102 provide data as gathered, over time, from different advertising platforms. As such, the data sources are adapted to upload or "push" data to the system 100 as the campaign analytics are published by each respective advertising platform.

According to another embodiment, the TS engine 104 can analyze "real-time" data collected by the media-link module 112 with regard to one or more online campaigns. The media-link module 112 is configured to tap into advertising platforms and to track their entire media plans. The media plan is typically defined by a media agency and entails media platforms for the campaign. The media plan is designed to find the specific combination of media to best achieve the marketing campaign objectives.

Therefore, the media-link module 112 gathers other data related to advertising campaigns in real time, when such data is published and/or collected by an advertising platform. The data gathered by the module 110 is input to the sanitizing module 102. An advertising platform may be an ad-serving system of an ad-serving company, a social media website, a content publisher, and the like.

In an exemplary implementation, the media-link module 112 includes a unified tracking server 114, a cookie storage database 116, a trafficking manager 118, and a data aggregator 119. The unified tracking server 114 provides pixel tracking services for mapping users of different platforms of ad-serving companies. The tracking server 114 is further configured to provide unified user tagging across the different platforms. In embodiment, the unified tracking server 114 handles HTTP/HTTPS calls generated by client devices. Each client device (or user) is assigned a unique user-ID and its activity is logged in the unified tracking server's 114 log file. Thereafter, those log files are loaded to the TS engine 104. Users of client devices include viewers viewing advertisements displayed on webpages, mobile applications, online games, and the like.

The cookie storage database 116 is configured to store a server side cookie, which is an extension to the HTTP cookie mechanism or a replacement thereof, in environments that do not support HTTP cookies (e.g., IPTV, Mobile). The cookie storage database 116 is configured to serve as a means to provide a unified user level cookie which is in a persistent user state in a scalable manner. This process for persistent user state is further discussed below.

The trafficking manager 118 is utilized for a pixel trafficking service that taps into the different ad-serving platforms and enables tracking of media plans. A tracking pixel is a tag in a form of an HTML tag and JavaScript file installed or placed in an advertising platform. The tracking pixel calls to another service to provide the media-link module 112 with analytics information gathered from the advertising platform.

In one embodiment, the trafficking manager 118 included in the media link module 112 provides the means to automatically place a proprietary tracking tag on top of an existing media plan on various ad-serving platforms. This allows combining user level data from multiple ad-serving platforms.

The trafficking manager 118 is configured to connect to an advertising platform (e.g., an ad-serving server) through an API, extract the media plan, and learn the different entities of the extracted media plan. Then, the extracted media plan is mapped to a predefined media plan structure utilized by the system 100. Once the trafficking manager 118 learns the structure of the extracted media plan, the manager 118 is configured to create proprietary tracking tags and update the advertising platform media plan to call up those proprietary tracking tags (e.g., through the API).

In an embodiment, the trafficking manager 118 dynamically learns of the changes made in the media plans of previously tagged advertising platforms. With this aim, the trafficking manager 118 periodically connects to the advertising platforms, and for each platform the manager 118 is configured to compare its existing snapshot of the media plan with a current media plan of a respective platform and to make the necessary adjustments.

The data aggregator 119 receives raw data from the unified tracking server 114. The raw data may be in a serialized and optimized data format. The data aggregator 119 is configured to validate and aggregate the raw data into multiple aggregations and analytical computation, such as summing up events per hour per location, calculation overlap between different channels, and so on. The aggregated data is input to the data sanitizing module 102. In one embodiment, the data processed by the data aggregator 119 can be stored for future usage, such as custom querying and data analytics services.

Figure 2:
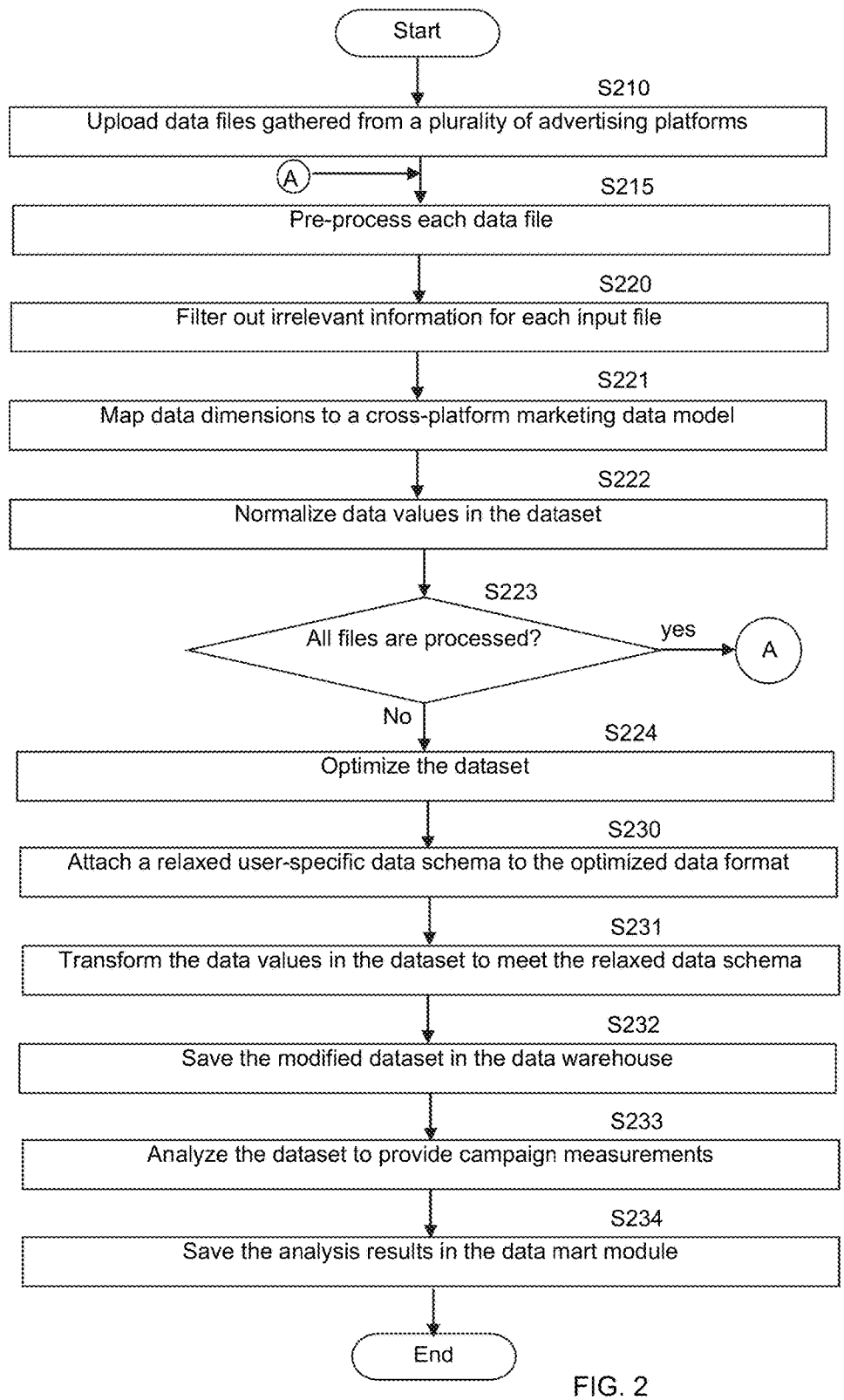
FIG. 2 is a flowchart illustrating a method for providing cross-platform analytics according to one embodiment.

FIG. 2 shows an exemplary and non-limiting flowchart 200 illustrating a method for providing cross-platform analytics according to one embodiment. The method is performed by the data sanitizing module 102 and TS engine 104 of the system 100.

At S210, data gathered by a plurality of advertising platforms regarding one or more advertising campaigns are uploaded to the data sanitizing module 102. The uploaded data may be received from ad-serving companies, social media websites, advertisement agencies, and the like. The received data may be provided to the module 102 in either pull or push operation modes.

As noted above, the data sanitizing module 102 supports a plurality of protocols for communication with the data sources and platforms for receiving data. In one embodiment, input data may be in any data format, such as structured, unstructured, and standardized (e.g., Excel, XML, and the like). For the sake of simplicity and without limiting the scope of the disclosed embodiments, the data are uploaded in a form of files.

Optionally, at S215 the received data is pre-processed. This includes, but is not limited to, decryption of data received in an encrypted form. With this aim, the module 102 maintains or receives over a secured connection the relevant encryption keys from the data owner. In one embodiment, S215 further includes identification and association of each input data file with its respective data owner entity.

At S220, each input data file is parsed to filter out irrelevant information contained in the file. As a non-limiting example, an Excel file is parsed to identify blank rows and to remove such rows from the file. As another limiting example, headers and commentary information are filtered out as well.

At S221, data dimensions (fields) in the input file are mapped to a cross-platform marketing data model. This data model is designed according to the disclosed embodiments to support marketing and analytical metrics of online advertising. In an exemplary embodiment, the cross-platform marketing data model defines at least a date dimension and at least one metric dimension. The at least one metric dimension may be predefined in the system 100 and customized by the user. Examples for such metric dimensions include, but are not limited to, impressions counts, click counts, conversion, media cost, placement, and so on. The data model may also define dimensions such as currency, geographical location, campaign name, a default value, and the like. The cross-platform marketing data model further defines the relationship between objects, their hierarchies, their data type, and their format. It should be noted that the system 100 may be preprogrammed with the cross-platform marketing data model which may be further customized by a user of the system.

The mapping of dimensions (fields) in the input file to the cross-platform marketing data model includes analyzing the input file to determine a data type of each field and field name, matching between a source field name and a dimension in the model based in part on the data type and the field name. For example, if a source field name in the input file is "clicks", it can be mapped to a metric dimension "delivery clicks" in the predefined data model. The mapping is performed for each dimension or a predefined set of dimensions in the input file. Data entries that cannot be mapped to the dimensions in the cross-platform marketing data model are placed in the default value dimensions. The result of S221 is a dataset being organized and functioning as defined in the cross-platform marketing data model.

At S222, data values in the dataset are normalized to be represented in a unified notation. In one embodiment, data values of common data dimensions are normalized. For example, common data dimensions are related to data entries likely to appear in most of the files input to the module 102. Examples for common data dimensions include, but are not limited to, date, currency, country, zip code, and so on. The data normalization may include for example, representing a date dimension (field) in a notation of 'MM/DD/YYYY', converting currency to USD (using a current exchange rate), representing a country code using 2 characters, and so on. The unified notation is determined by the format of the respective dimension as defined in the cross-platform marketing data model. The result of S222 is a normalized dataset being organized and functioning as defined in the cross-platform marketing data model.

At S223, a check is made to determine if all input files are processed, and if so execution continues with S224; otherwise, a new input file is selected and execution returns to S215. The execution reaches 224 when data contained in all the input files are aggregated in the normalized dataset and organized to function as defined in the cross-platform marketing data model. At S224 the normalized dataset is further optimized to allow faster manipulation of the data. In one embodiment, the optimization includes saving the dataset in a column-based format. It should be noted that during the manipulation and organization of input data files, data is saved in a storage device, which may be a database, the data warehouse 130 and the like.

At S230, a relaxed data schema is attached to the normalized dataset. The relaxed data schema includes data types, dimensions, metric definitions, hierarchy of data fields, and an aggregation function for each metric. In an embodiment, the relaxed data schema determines how data values from the normalized dataset will be read and manipulated. The relaxed data schema is user-specific, i.e., it is defined based on the user's requirements.

At S231, data values in the normalized dataset are transformed to comply with the relaxed data schema. The data transformation is performed by means of a plurality of transformation rules. A transformation rule defines at least one of the following actions to be performed on the data: alteration, classification, and segmentation. For example, the segmentation rule may define that all impressions counted during a weekend will be grouped together. As another example, personal information recorded in one record in the following notation 'first-name_last-name_age_gender' is expanded into different individual attributes, such as 'first name', 'last name', 'age' and 'gender'. This allows aggregating and performing analytic functions on each attribute individually. The system 100 through the UI module 110 allows the user to define transformation rules. S231 results in a modified dataset that meets the definitions of the relaxed data schema. At S232, the data populated to meet the relaxed data schema is saved in the data warehouse 130 for later usage.

At S233, the modified dataset is analyzed to provide measurements on the aggregated data. In one embodiment, the analysis includes aggregation and analytical calculations across all measurable data items in the modified dataset and/or with respect to campaign objectives. The statistical measurements include, but are not limited to, an average, a normal distribution, a maximum value, a minimum value, an absolute value, and so on. A measurable data item is any item that can be aggregated. For example, currency values, conversion rates, a number of hits, a number of clicks through, a number of fans, a number of page views, and a number of leads are merely a few examples for measurable data items. Additional examples are provided above.

At S234, the results of the analysis are saved in the data-mart module 106. That is, the computed measurements are saved as part of the dataset or in association with the dataset. The data mart module 106 is configured to adapt the data received, from the TS engine 104, into a format accessible and query-able by the management UI module 110.

Figure 3:
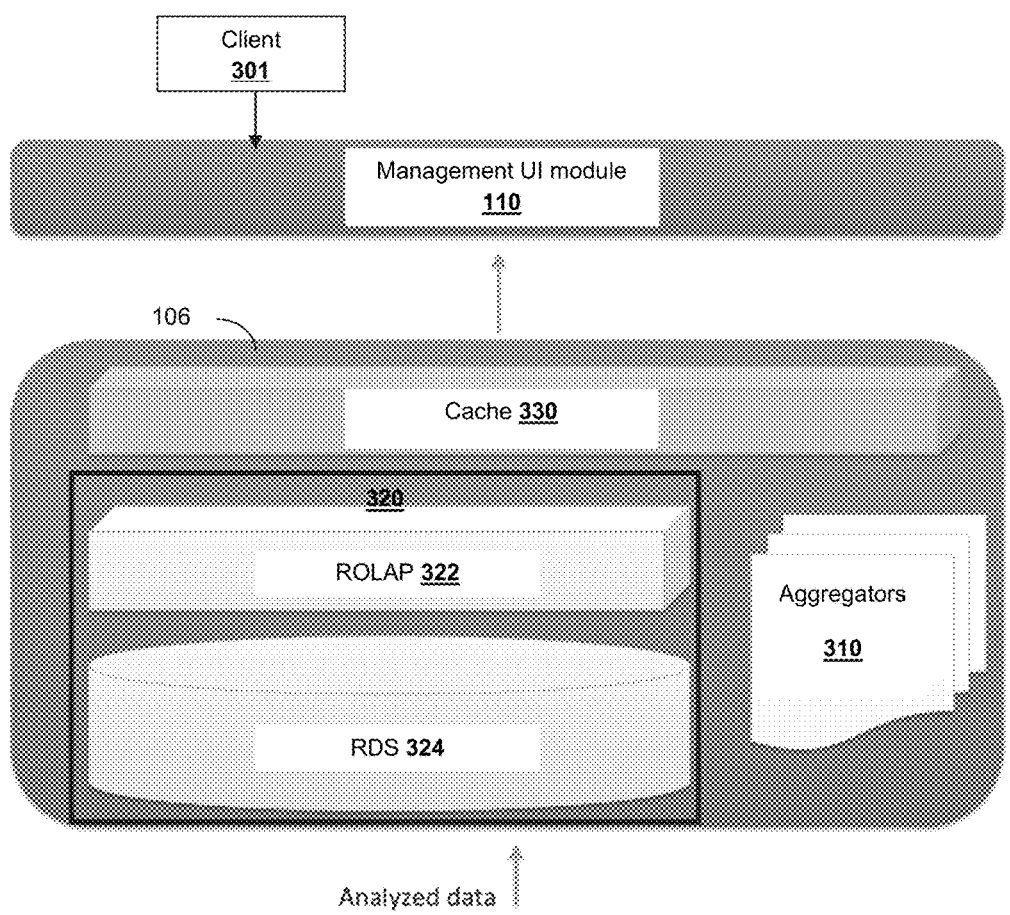
FIG. 3 is a block diagram of the data mart module.

FIG. 3 shows a non-limiting and exemplary block diagram of the data mart module 106 constructed according to one embodiment. The data mart module 106 serves different functions, such as but not limited to, dashboards, custom reporting, and scheduled reports, as well as advanced forecasting and what-if scenario building. The data mart module 106 includes a plurality of aggregators 310, a database 320, and a cache memory 330. In the implementation illustrated FIG. 3, the database 320 is realized as a ROLAP database 322 and a relation data store (RDS) database 324. The ROLAP is a Relational Online Analytical Processing Engine (ROLAP) designed to access data in a relational database and generate SQL queries to calculate information access to the data in a relational database and generate SQL queries to calculate information at the appropriate level when an end user requests it. In an embodiment, the ROLAP database 322 is designed to provide a query API that supports "Pivot Table" like-API, enabling operations on Rows, Columns, Dimensions, Measurements, Filters, Sorting, Aggregations, and so on.

The aggregators 310 provide a pre-defined and fast access to the data model generated by the TS engine 104, thereby enabling efficient utilization by the dashboards and analytics modules. In one embodiment, the aggregators 310 map different data points into summaries by key and updates the aggregations. This enables accessing the aggregated data in O(1) complexity.

In an exemplary embodiment, each summary is provided for time based analytics. In order to "compress" this problem into a key/value store, date-string suffixes are appended to the keys, e.g., "delivery_by_day:nike:2012-01-01". Having the gathered data split by day allows calculating of statistics (e.g., totals, averages, unions) over arbitrary user-defined time periods. For example, a user can select the time range "Jan. 1, 2012-Feb. 1, 2012", and the system 100 would accurately compute the statistics by summing the results of a multiple keys get operation of each day in the range. It should be noted that the aggregations are also being performed on the server side and not on the requesting client side.

The RDS database 324 provides a flexible access to the relaxed user-specific data module provided by the TS engine 104. The RDS database 324 supports more complex data queries that the aggregators 310 cannot answer, and less interactive workloads such as scheduled reports, custom reports and different ad-hoc queries. The OLTP database 322 is the main repository of all system metadata. The OLTP database 322 includes the definition of all clients and their settings, for example: users, brands, data sources, data mapping schema, system configuration, and so on.

The cache 330 is designed to store the results of previous queries submitted to the system 100. By caching the results of queries, responses to repeated queries can be reused, thereby avoiding performance of previously computed operations. The cached results are available across the sessions (i.e. for use by sessions other than the one that first executed the query) and across platforms.

The management UI module 110 provides a user interface and API for users of the systems. The users can access the system through a client 301's web browser, a mobile device, a tablet computer, and an automated client (API). By means of the management UI module 110, users interact with the elements of the data mart module 106 in order to view and retrieve the outputs generated by the system 100. With this aim, the management UI module 110 provides a suite of data visualization functions including, but not limited to, dashboards, customized and embeddable analytics modules, custom reports, and scheduled reports. The management UI module 110 further allows users of clients 301 to select different platforms from which to upload the input data, to customize the data model, to implement extraction of APIs, and to set permission and access controls for the system.

Figure 4:
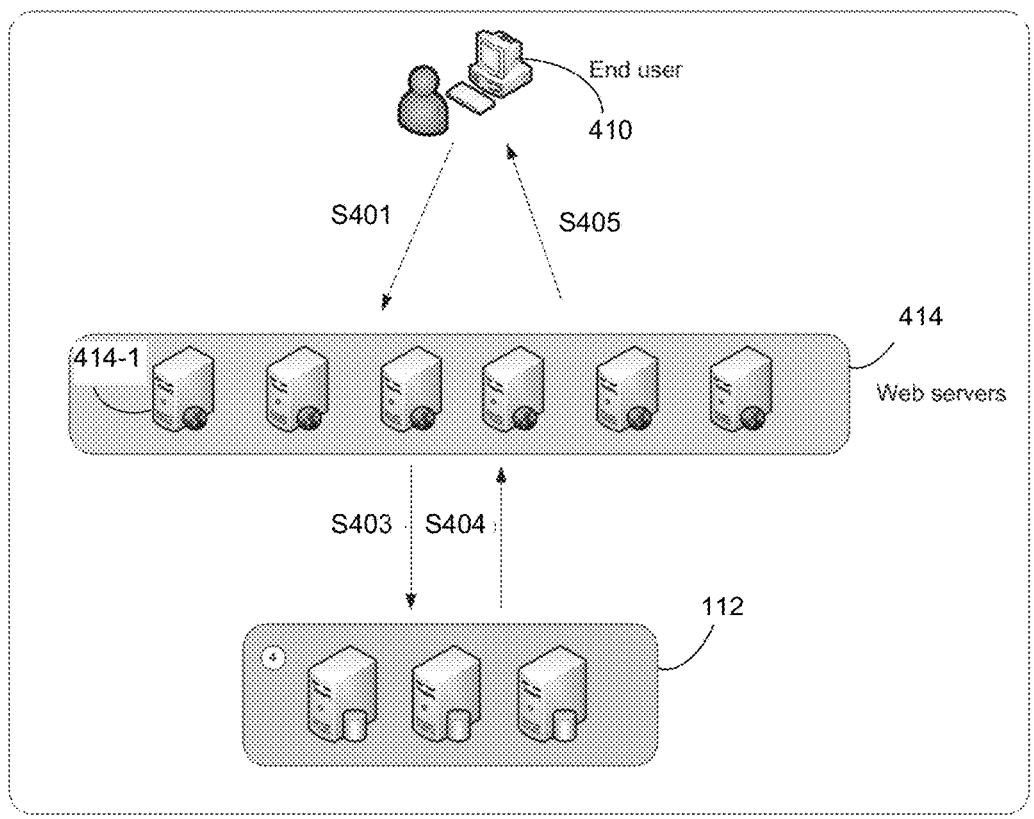
FIG. 4 is a diagram of a HTTP request/response cycle in a load balanced web server environment that uses the disclosed process for providing a unified user level database.

FIG. 4 shows an exemplary HTTP request/response cycle 400 in a load balanced web server environment that uses the disclosed process for providing a unified user level cookie. Typically, each advertising platform provides its own unique identifier (i.e., a cookie) to mark a user. Thus, the same user can be logged to numerous users based on received different cookies if such are maintained by a conventional user-level cookie database. This would result in data loss and inconsistencies. The proposed process for providing a unified user level cookie performed by the media link module 112 overcomes this deficiency.

At S401, a client 410 of a user issues an HTTP request. Then, the client's HTTP request is received from a web server of the server farm 414. Typically, a load balancer is connected between the client 410 and the farm 414 and makes a decision as to which web server to redirect the request. At S403, the web server (e.g., server 414-1) that receives the HTTP request is configured to generate a request to the media-link module 112 to retrieve the user's session based on the user-ID cookie value.

At S404, the module 112 and the cookie storage 116 respond with the serialized session objects respective of the user-ID cookie value contained in the request. These objects are sent to the web server issuing the request (e.g., server 414-1). In turn, the server 414-1 is configured to de-serialize the session objects and complete processing of the user's request. At S405, using the received session objects the web server 414-1 sends the HTTP response directly to the requesting client 410.

In another embodiment, the media link module 112 is configured to feed conventional user level databases by utilizing a global user identifier across different advertising platforms. This would allow users of the system 100 (e.g., marketers and campaign managers) to maintain a consistent user level database, thereby facilitating their understanding of the reach of their advertising campaigns. It should be appreciated that creating a consistent user level database further allows the client to gain full control and ownership of the cookie data, maintain an open platform mindset, support multiple ad serving technologies at the same time, enhance the cookie level database with third party data providers, and leverage ad-serving companies' user level databases and data ownership to optimize media buys over ad exchanges.

Figure 5:
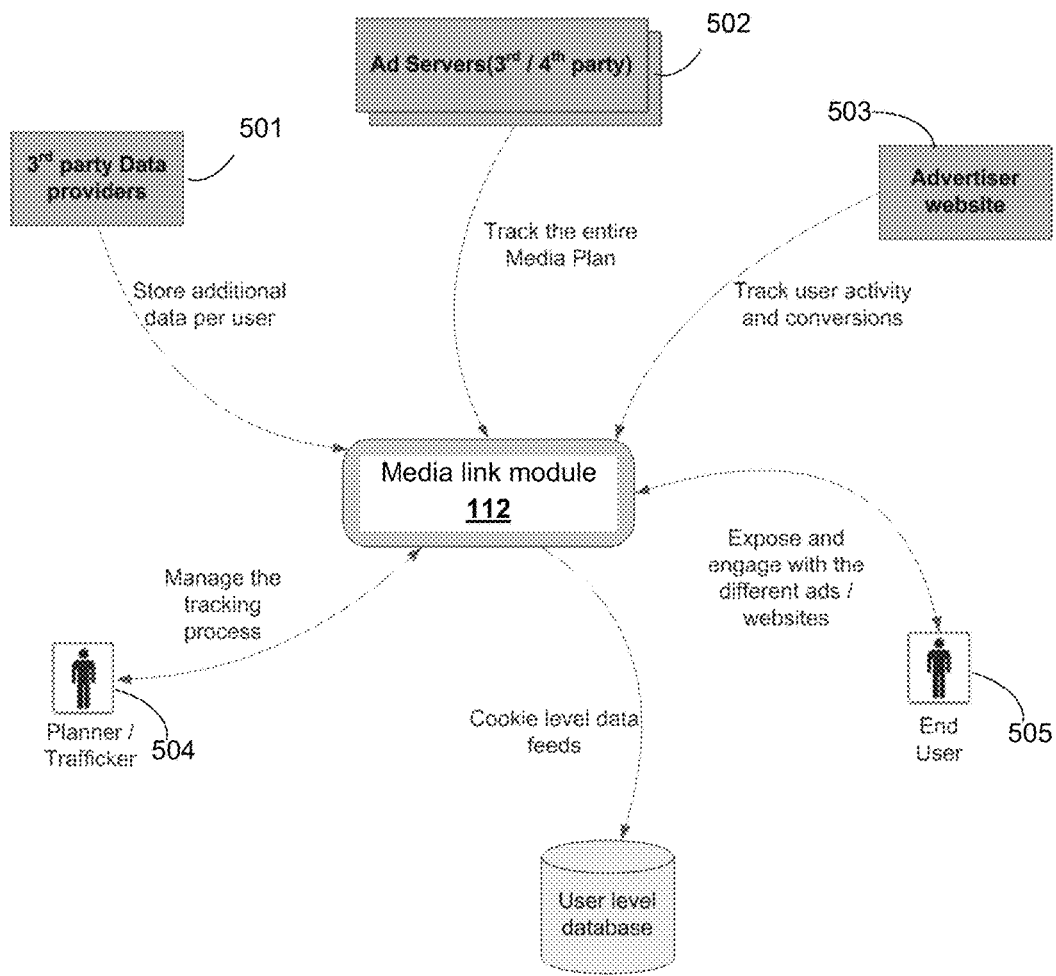
FIG. 5 is a diagram illustrating the entities interfacing with the unified tracking system.

As illustrated in FIG. 5, the media link layer 112 can interface with a plurality of entities. These entities include third party data providers 501, ad-serving servers 502, advertiser websites 503, media planners 504, and end-users 505. The module 112 allows the end-users 505 to expose and engage with different advertiser websites and also provides consistent cookie level data feeds. The communication is facilitated through the unified tracking server 114 of the module 112. Third party data providers are companies that collect and share information about users surfing the web.

FIG. 6 illustrates the process for tracking cookie level data according to an exemplary embodiment. At S601, a user 610 (e.g., by means of a web browser installed on the client device) accesses a publisher webpage hosted in a publisher web site 612. This webpage contains an advertisement placement being tracked by the medial line link module by means of the unified tracking server 114.

At S602 the user's browser calls an advertisement server 614 and displays the advertisement. At S603, the unified tracking server 114 records the impression (a measure of the number of times the advertisement is displayed on the user's 610 browser). At S604, as the user clicks on the advertisement, the browser navigates to an advertiser website 616. The advertiser website 616 contains conversion tags assigned by the media link module 112. At S605, the browser of the end-user 610 calls the media link module 112 in order to count the conversion as reported by the conversion tags included in the server 616. At S606, the unified tracking server 114 in the media link 112 stores the cookie level data in the cookie storage database 116. A cookie level data is a proprietary data structure that contains information about a user associated with a unique user identifier. The information is gathered through the tracking pixel.

In order to tag end-users (ad viewers) globally across different advertising platforms, a new domain name and cookie structure is disclosed. In one embodiment, the tracking domain name included in the media-link module's tracking tag will issue to a user a new domain name which is a sub-domain of the respective client domain name. A client may be, but is not limited to, an advertiser, a marketer, and an advertisement agency.

The disclosed cookie structure includes a user ID cookie, which contains a unique identifier of the end user. In one embodiment, the structure of the cookie level data utilized by media link is as defined as follows:

Cookie Description:
Cookie Name: U
Cookie Value: Globally unique identifier (GUID)
Host: .acme.com Path: /
Expires: 31-Dec-2040 00:00:00 GMT It should be noted that the cookie is added on the top level domain (.acme.com) so that the data can be shared at the sub-domain level.

In order to track post-impression and post-click conversions on the advertiser's website, the unified tracking server 114 is required to embed proprietary conversion tags. In one exemplary embodiment, the proprietary conversion tags use the same client's root domain name which allows the ability to show a full path to conversion including all advertisements from all the different vendors (due to the fact that they will share the same top level domain).

One of the advantages of using the unified tracking server 114 is the ease of integrating third party data provider data with the client cookie level data. Most of the data providers are using the method called cookie matching to pass the user level information from their cookie to their partner's cookies. The unified tracking server 114 supports this cookie matching process, so that third party data can flow directly to a client's user level database.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A system for use in providing optimized performance for cross-platform data analytics of information, comprising:
   a media-link module comprising:
      a unified tracking server comprising circuitry configured to:
         provide pixel tracking services for mapping users of a plurality of platforms; and
         provide unified user tagging of the users of the plurality of platforms;
      a cookie storage database comprising circuitry configured to store cookies of the users of the plurality of platforms to provide a persistent user state for each user;
      a trafficking manager comprising circuitry configured to provide a pixel trafficking service by tapping into the plurality of platforms; and
      a data aggregator comprising circuitry configured to aggregate real-time data from the unified tracking server, wherein the real-time data is related to a common subject from the plurality of platforms, and at least two of the platforms store the real-time data in different formats;
   a data sanitizing module comprising circuitry configured to:
      receive the aggregated real-time data from the data aggregator; and
      produce a normalized dataset having data values that comply with a unified format from the aggregated real-time data;
   a storage and transformation (TS) engine comprising circuitry configured to:
      transform data values in the normalized dataset into a format defined by a relaxed data schema specified by a user, thereby resulting in a relaxed dataset, wherein the relaxed data schema comprises a data type, a dimension, a metric definition, a hierarchy of data fields, and an aggregation function for the metric definition; and
      compute a plurality of measurements related to the common subject of measurable data values included in the relaxed dataset;
   a data-mart module comprising circuitry configured to store the relaxed dataset together with the computed measurements; and
   a management user interface (UI) module comprising circuitry configured to allow client devices access to data stored in the data-mart module, wherein the data-mart module is optimized for providing accelerated retrieval of the data stored therein.

2. The system of claim 1, further comprising:
   a metadata database comprising circuitry configured to store metadata utilized by the TS engine for analyzing the real-time data.

3. The system of claim 1, wherein each platform of the plurality of platforms is an ad-serving system of an ad-serving company, a social media website, or a content publisher system.

4. The system of claim 3, wherein the data sanitizing module further comprises circuitry configured to receive the aggregated real-time data in any data format.

5. The system of claim 1, wherein the TS engine further comprises circuitry configured to transform the data values in the normalized dataset using a plurality of transformation rules.

6. The system of claim 5, wherein each transformation rule of the plurality of transformation rules is an alteration rule classification rule, or segmentation rule.

7. The system of claim 5, TS engine further comprises circuitry configured to aggregate the measurable data values in the relaxed dataset.

8. The system of claim 7, wherein the TS engine further comprises circuitry configured to compute the plurality of measurements across all the measurable data values in the relaxed dataset.

9. The system of claim 8, wherein the plurality of platforms are advertising platforms and the real-time data comprises campaign information, and wherein the TS engine further comprises circuitry configured to compute the plurality of measurements based on at least one predefined campaign objective.

10. The system of claim 9, wherein the TS engine further comprises circuitry configured to determine that the at least one predefined campaign objective is met based on the computed measurements.

11. The system of claim 1, wherein the data module further comprises circuitry configured to support a plurality of user interface functions performed by the management UI module, wherein the plurality of user interface functions comprise generation of a dashboard display, a custom reporting, scheduled reporting or what-if scenario reporting.

12. The system of claim 1, wherein the data mart module further comprises:
 a plurality of aggregators comprising circuitry configured to provide a pre-defined access to the relaxed data set;
 a relation data store (RDS) database comprising circuitry configured to address a set of queries that cannot be served by the plurality of aggregators; and
 a cache memory comprising circuitry configured to store results of queries previously addressed by the plurality of aggregators and the RDS database, wherein the results are available across different sessions.

13. The system of claim 1, wherein the trafficking manager further comprises circuitry configured to:
 connect to each of the plurality of the platforms;
 extract a media plan of each of the plurality of the platforms;
 learn various entities of the extracted media plan; and
 map the extracted media plan a predefined media plan.

14. The system of claim 13, wherein the trafficking manager further
 comprises circuitry configured to:
 create proprietary tracking tags; and
 update a media plan of a respective platform of the plurality of platforms to call the proprietary tracking tags to capture changes in the media plan.

15. A method for use in providing optimized performance for performing cross-platform data analytics of information, comprising:
 providing pixel tracking services for mapping users of a plurality of platforms;
 providing unified user tagging of the users of the plurality of platforms;
 storing cookies of the users of the plurality of platforms to provide a persistent user state for each user;
 providing a pixel trafficking service by tapping into the plurality of platforms;
 aggregating real-time data from the plurality of platforms, wherein the real-time data is related to a common subject from the plurality of platforms, and at least two of the platforms store the real-time data in different formats;
 producing a normalized dataset having data values that comply with a unified format from the aggregated real-time data;
 transforming data values in the normalized dataset to a format defined in a relaxed data schema specified by a user, thereby resulting in a relaxed dataset, wherein the relaxed data schema comprises a data type, a dimension, a metric definition, a hierarchy of data fields, and an aggregation function for the metric definition;
 computing a plurality of measurements related to the common subject of measurable data values included in the relaxed dataset;
 storing the relaxed dataset together with the computed measurements in a data-mart module; and
 allowing client devices access to data stored in a data-mart module, wherein the data-mart module is optimized for providing accelerated retrieval of the data stored therein.

16. The method of claim 15, wherein each platform of the plurality of platforms is an ad-serving system of an ad-serving company, a social media website, or a content publisher.

17. The method of claim 15, wherein transforming the data values in the normalized dataset is performed using a plurality of transformation rules, wherein each transformation rule of the plurality of transformation rules is an alteration rule, classification rule, or segmentation rule.

18. The method of claim 15, wherein computing the plurality of measurements further comprises:
 aggregating the measurable data values in the relaxed dataset; and computing the plurality of measurements across all the measurable data values in the relaxed dataset.

19. The method of claim 18, further comprising:
 determining that at least one predefined campaign objective is met based on the computed measurements.

20. The method of claim 15, wherein the data mart module is further configured to support a plurality of user interface functions performed by a management UI module by pre'viding a query able dataset, wherein the plurality of user interface functions comprise generation of a dashboard display, a custom reporting, scheduled reporting, or what-if scenario reporting.

21. The method of claim 15, further comprising:
 connecting to each of the plurality of the platforms;
 extracting a media plan of each of the plurality of the platforms;
 learning various entities of the extracted media plan; and
 mapping the extracted media plan into a predefined media plan.

22. The method of claim 21, further comprising:
 creating proprietary tracking tags; and
 updating a media plan of a respective platform of the plurality of platforms to call the proprietary tracking tags to capture changes in the media plan.

23. A non-transitory computer readable medium having stored thereon instructions for causing one or more processing units to execute a method comprising:
 providing pixel tracking services for mapping users of a plurality of platforms;
 providing unified user tagging of the users of the plurality of platforms;
 storing cookies of the users of the plurality of platforms to provide a persistent user state for each user;
 providing a pixel trafficking service by tapping into the plurality of platforms;
 aggregating real-time data from the plurality of platforms, wherein the real-time data is related to a common subject from the plurality of platforms, and at least two of the platforms store the real-time data in different formats;
 producing a normalized dataset having data values that comply with a unified format from the aggregated real-time data;
 transforming data values in the normalized dataset to a format defined in a relaxed data schema specified by a user, thereby resulting in a relaxed dataset, wherein the relaxed data schema comprises a data type, a dimension, a metric definition, a hierarchy of data fields, and an aggregation function for the metric definition;

computing a plurality of measurements related to the common subject of measurable data values included in the relaxed dataset;

storing the relaxed dataset together with the computed measurements in a data-mart module; and allowing client devices access to data stored in a data-mart module, wherein the data-mart module is optimized for providing accelerated retrieval of the data stored therein.

* * * * *